C. E. MILLS.
SHIFT STRUCTURE.
APPLICATION FILED JULY 8, 1919.
1,355,346. Patented Oct. 12, 1920.
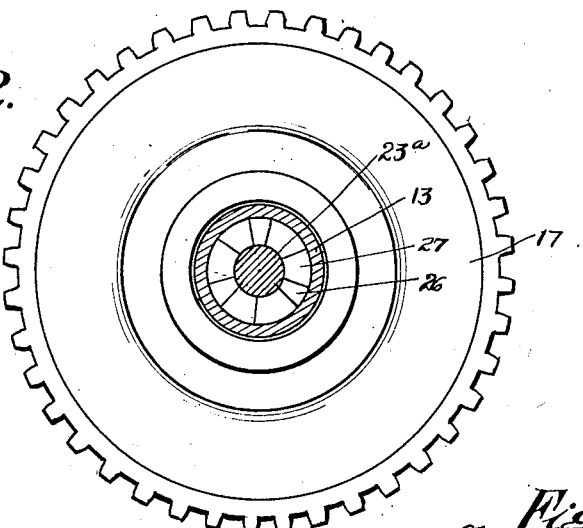
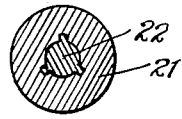
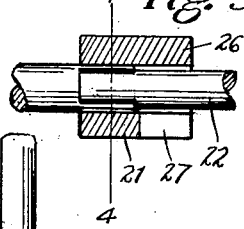
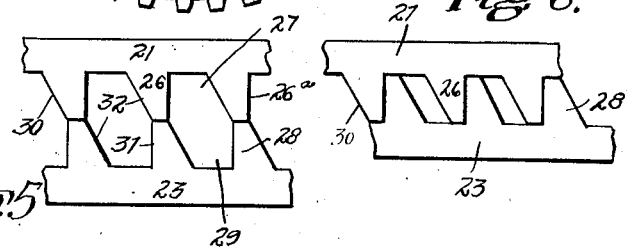
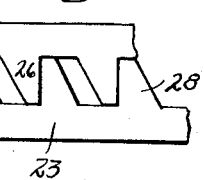
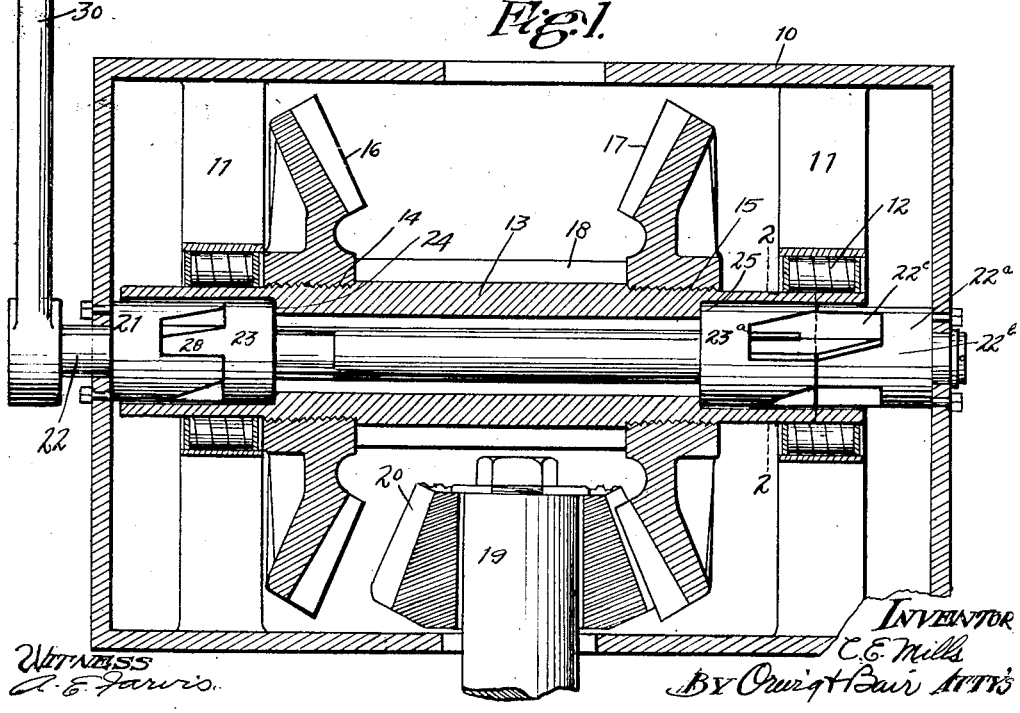

UNITED STATES PATENT OFFICE.

CLAUD E. MILLS, OF DES MOINES, IOWA.

SHIFT STRUCTURE.

1,355,346.  Specification of Letters Patent.  Patented Oct. 12, 1920.

Application filed July 8, 1919. Serial No. 309,410.

*To all whom it may concern:*

Be it known that I, CLAUD E. MILLS, a citizen of the United States, and a resident of Des Moines, in the county of Polk and State of Iowa, have invented a certain new and useful Shift Structure, of which the following is a specification.

The object of my invention is to provide a shift structure of simple, durable and inexpensive construction.

More particularly it is my object to provide such a device having a hub slidably and rotatably mounted and provided with gearing devices adapted to move respectively to coöperative position with another gearing device when the hub is slid longitudinally, and to provide in connection with said sliding hub and gearing devices simple and novel mechanism for controlling and actuating the sliding movement of the hub.

A further object is to provide a clutch mechanism so constructed and arranged as to impose a minimum of wear on the parts when they are in engaging position, while at the same time utilizing the maximum strength of said parts.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a central, sectional view through a reverse gear clutch mechanism embodying my invention, and mounted in a suitable gear casing.

Fig. 2 shows a sectional view taken on the line 2—2 of Fig. 1.

Fig. 3 shows a sectional view of one of the clutch members which is fixed to the gear casing.

Fig. 4 shows a sectional view taken on the line 4—4 of Fig. 3.

Fig. 5 shows two of the coacting clutch members laid out in plan and arranged in one of their relative positions.

Fig. 6 shows a similar view illustrating said coacting clutch members in another of their adjusted positions.

In the accompanying drawings I have used the reference numeral 10 to indicate generally the gear casing in which most of the operative mechanism of my shift structure is contained.

Within the gear casing 10 are cross frame members 11 forming supports for the parts hereinafter mentioned.

Mounted in the frame members 11 are roller bearings 12. Slidably and rotatably mounted in the roller bearings 12 is a hollow hub 13. On the hub 13 between the respective frame members 11 are screw-threaded portions 14 and 15. Mounted on the respective screw-threaded portions 14 and 15 are oppositely facing spaced beveled gears 16 and 17.

A considerable portion of the hub 13 between the gears 16 and 17 is provided with teeth 18 adapted to coact with a gear extended through the wall of the casing 10.

Extending through the wall of the casing 10 is a power shaft 19, on the inner end of which within the gear casing is a beveled gear 20, designed to mesh with the respective beveled gears 16 and 17 in different sliding positions of the hub 13.

Extending through the opposite walls of the gear casing 10 and through the hollow hub 13 is a shaft 22.

Received within one end of the hollow hub 13 and fixed to the interior wall of the gear casing 10, is a clutch member 21 provided with the alternating teeth and notches 26 and 27. Each tooth 26 has one face 26ª with its longitudinal axis parallel with the longitudinal axis of the hub 13, and has another face 30, which is beveled.

The clutch member 21 is shown laid out in blank in Fig. 5.

Slidable but non-rotatable on the shaft 22 adjacent to the clutch member 21, is a coacting clutch member 23 which is shown laid out in plan in Figs. 5 and 6.

The clutch member 23 has alternating teeth 28 and notches 29. The teeth 28 each have a beveled edge or face 32, and a face 31 with its longitudinal axis parallel with the longitudinal axis of the face 22. The hollow hub 13 is provided with an annular shoulder 24 against which the clutch member 23 abuts. The clutch members 21 and 23 are so arranged that when the teeth 28 of the clutch member 23 are received within the notches 27 of the clutch member 21, the beveled faces of the teeth of the clutch members will be adjacent to each other as illustrated in Figs. 1 and 6.

Received within the other end of the hub 13, mounted on the shaft 22 and fixed to the wall of the casing 10, opposite the clutch member 21, is a clutch member 22ª, similar in structure to the clutch member 21, having teeth 22ᵇ and notches 22ᶜ, similar to the teeth 26 and notches 27.

Received within the hub 13, adjacent to the clutch member 22ª is a clutch member 23ª, similar in structure to the clutch member 23. The clutch member 23ª abuts against an annular shoulder 25 formed on the inside of the hub 13. On the shaft 22 outside the casing 10 is a handle 30.

I will now describe the practical operation of my improved shift structure. It will be understood that the clutch members 23 and 23ª are slidably but non-rotatably mounted on the shaft 22 and when the teeth of one of the clutch members 23 or 23ª enter the notches of the adjacent clutch member, the teeth of the other clutch member 23 or 23ª, as the case may be, will be free from the notches of its co-acting clutch member. Thus when the gear 17 is in mesh with the gear 20, the teeth of the clutch member 23, will have fully entered the notches 27 and rotation of the shaft 19 will impart rotation to the gear 17, and the hub 13, so that any machinery, which it may be desired to operate from the hub 13, may be thus operated.

It will be seen that in this operation the faces 31 and 26ª of the teeth engage each other for thereby imposing a minimum of wear on the clutch members and utilizing the maximum strength thereof.

If it is desired to shift the hub 13 to neutral position the handle 30, is moved in anticlockwise direction. The first movement of the handle 30 serves to move the teeth 28 away from the teeth 26 with which they have been heretofore engaged, and to bring the beveled edges of the teeth 28 and 26 together. This same movement caused the teeth on the clutch member 23ª to clear the ends of the teeth 22ᵇ on the clutch member 22ª. The next movement of the lever 30 causes the teeth 28 to slide on the beveled faces of the teeth 26 forcing the clutch member 23 longitudinally on the shaft 22 away from the clutch member 21. At the same time the hub 13 is moved toward the right for causing the teeth on the clutch member 23ª to enter the notches 22ᶜ.

It will be seen that the movement just described may be stopped at such a point as to hold the hub 13 in neutral position, where neither of the gears 17 or 16 is in engagement with the gear 20. A further movement of the arm or lever 30 causes the teeth on the clutch member 23ª to fully enter the notches in the clutch member 22ª, and causes the teeth 28 to entirely withdraw from the notches 27 of the clutch member 21. A little further movement of the arm 30 causes the teeth of the clutch member 23ª to slide in the notches 22ᶜ and causes the teeth 28 to travel to the position shown in Fig. 5 with relation to the teeth 26. In the meanwhile the gear 16 will have engaged the gear 20.

Some changes may be made in the construction and arrangement of my device without departing from the essential features and purposes thereof, and it is my intention to cover by my claims any modified forms of structure or use of mechanical equivalents which may be reasonably included within the scope of my claims.

I claim as my invention.

1. In a device of the class described; a hollow shaft slidably and rotatably mounted; a pair of spaced opposite beveled gears on said shaft; a second shaft; a beveled gear thereon adapted to mesh with either of said first described beveled gears in different positions of the sliding movement of the first shaft; a supporting frame; spaced clutch members on said supporting frame; a third shaft extended through said first shaft; clutch members mounted on said third shaft adjacent to the first described respective clutch members; said second described clutch members being slidably but non-rotatably supported on said third shaft; said first shaft having on its interior, shoulders arranged to abut against said second described clutch members, the respective members of each pair of clutch members having co-acting notches and teeth, the co-acting teeth being provided respectively with beveled edges and with edges having their longitudinal axis parallel with the longitudinal axis of said third shaft.

2. In a device of the class described, a hollow shaft slidably and rotatably mounted; a pair of spaced opposite beveled gears on said shaft; a second shaft; a beveled gear thereon adapted to mesh with either of said first described beveled gears in different positions of the sliding movement of the first shaft; a supporting frame; spaced clutch members on said supporting frame; a third shaft extended through said first shaft; clutch members mounted on said third shaft adjacent to the first described respective clutch members; said second described clutch members being slidably but non-rotatably supported on said third shaft, said first shaft having on its interior shoulders arranged to abut against said second described clutch members, the respective members of each pair of clutch members having co-acting notches and teeth, the co-acting teeth provided respectively with beveled edges and with edges having their longitudinal axes parallel with the longitudinal axis of said third shaft; said teeth having flat outer ends.

3. In a device of the class described; a support; a hollow shaft slidably and rotatably mounted; a second shaft suitably supported and received within said first shaft;

clutch members mounted on said co-acting clutch members on said second shaft within said first shaft arranged adjacent to the respective first described clutch members; said first shaft having on its interior shoulders, arranged to abut against said second described clutch members; the respective members of each pair of clutch members having co-acting notches and teeth, the co-acting teeth being provided respectively with beveled edges and with edges having their longitudinal axes parallel with the longitudinal axis of said third shaft.

Des Moines, Iowa, June 10, 1919.

CLAUD E. MILLS.